United States Patent
Weber

[15] 3,635,527
[45] Jan. 18, 1972

[54] HEADREST AT THE BACKREST OF A MOTOR VEHICLE SEAT

[72] Inventor: Ludwig Weber, Boblingen, Germany
[73] Assignee: Daimler-Benz Aktiengesellschaft, Stuttgart-Unterkheim, Germany
[22] Filed: Feb. 16, 1970
[21] Appl. No.: 11,476

[30] Foreign Application Priority Data
Feb. 19, 1969    Germany.....................P 19 08 202.1

[52] U.S. Cl................................................297/410, 248/414
[51] Int. Cl.............................................................A47c 1/10
[58] Field of Search..................297/410, 347; 248/161, 408, 248/414

[56] References Cited

UNITED STATES PATENTS 3,454,303    7/1969    Dangauthier.........................297/396

FOREIGN PATENTS OR APPLICATIONS 807,753    4/1951    Germany...............................297/410

Primary Examiner—James C. Mitchell
Attorney—Craig, Antonelli & Hill

[57] ABSTRACT

A headrest at the backrest of a motor vehicle which is guided in the backrest by means of two mutually parallel support rods and is adjustable in its height; the support rods are slightly bent in the direction toward the back side of the backrest and are guided in substantially rectilinear guide members which include two guide bodies that are arranged at a distance from one another, surround the support rods and are slightly movable transversely to the longitudinal direction of the support rods.

20 Claims, 4 Drawing Figures

3,635,527

HEADREST AT THE BACKREST OF A MOTOR VEHICLE SEAT

The present invention relates to a headrest at the backrest of a motor vehicle seat which is guided in guide members provided in the backrest by means of two, mutually parallel support rods and is adjustable in its height position.

The present invention is concerned with the task to so construct the mounting of a headrest in the backrest of a motor vehicle seat by simple means that a stepless height adjustment of the headrest and a fixing of the adjusted height position is possible without disengagement or tightening of special fixing or locking means.

The underlying problems are solved in accordance with the present invention in that the support rods are slightly bent through in the direction toward the back side of the backrest and in that guide bodies are arranged in the rectilinear guide members with a spacing from one another, surrounding the support rods and movable transversely to the longitudinal direction of the support rods by a slight amount.

By the construction according to the present invention of the headrest support, a clamping connection is achieved between the support rods and the guide members in an advantageous manner which is disengaged by a pull opposite the support direction so that the headrest can be adjusted in its height by pulling the support rods out of the guide members or by pushing the support rods into the guide members. The clamping effect is thereby increased by the pressure against the headrest present during the use of the headrest.

A further increase of the clamping effect can be achieved in that in a further development of the present invention, a brake body projecting through an aperture in the upper or lower guide body is fixedly arranged at each guide member.

In order to facilitate the insertion of the support rods into the guide members, in each guide member one of the guide bodies may be arranged at the respective upper end of the guide member recessed in the backrest and the guide body may be provided with an insertion funnel.

In order that safety exists an unintentional pulling out of the support rods out of the guide members, a spring member abutting under prestress at the support rod may be arranged in each guide member at the lower guide body which, during pulling out of the support rod out of the guide member, detachably engages into a groove or the like provided at the free end of the support rod.

Furthermore, a spring may be arranged at each guide member between the two guide bodies which presses the lower portion of the upper guide body and the upper portion of the lower guide body in the direction toward the curved part of the support rod. The insertion of the bent support rods into the guide members is facilitated thereby.

Accordingly, it is an object of the present invention to provide a headrest at the backrest of a motor vehicle seat which avoids by simple means the aforementioned shortcomings and drawbacks encountered heretofore.

Another object of the present invention resides in a headrest for motor vehicle seats which can be adjusted in its height without involving complicated and costly means.

A further object of the present invention resides in a steplessly adjustable headrest for motor vehicle seats which enables a change in the height thereof without requiring any disengagement or tightening of separate fastening means.

Still a further object of the present invention resides in a headrest at the backrest of a motor vehicle seat which is simple in construction, extremely reliable in operation and requires only a minimum number of simple parts.

These and other objects, features, and advantages of the present invention will become more obvious from the following description when taken in connection with the accompanying drawing which shows, for purposes of illustration only, one embodiment in accordance with the present invention, and wherein.

Figure 1:
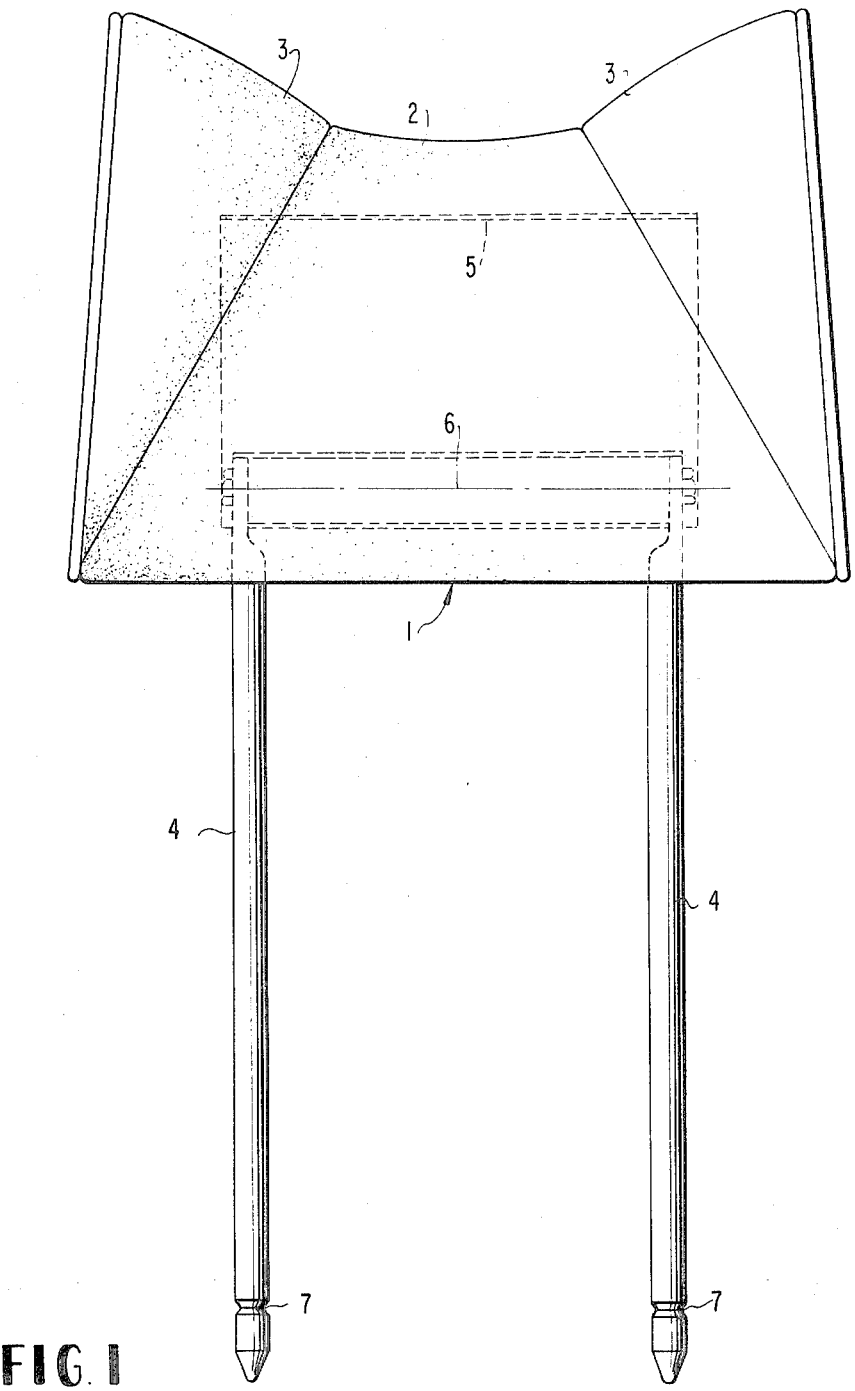
FIG. 1 is an elevational view, from in front, of the headrest with its support rods.
Figure 2:
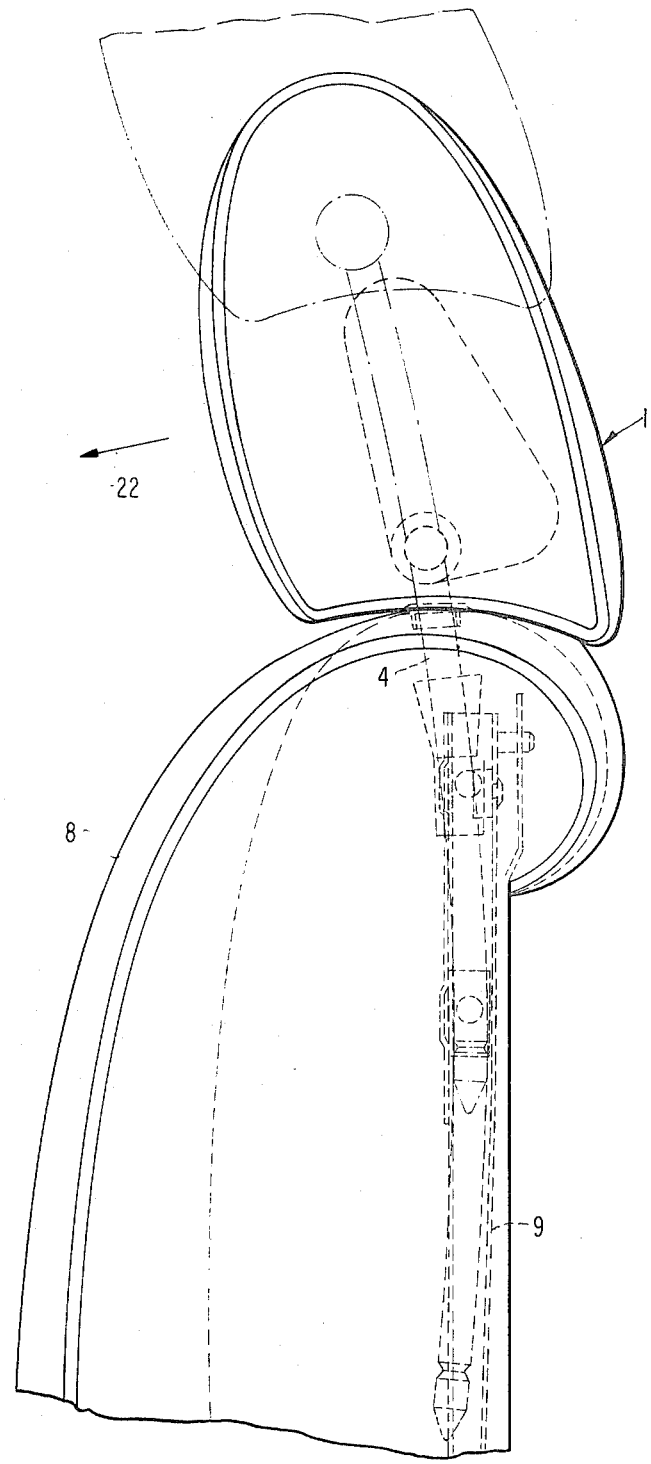
FIG. 2 is a side view of the backrest provided with a headrest according to FIG. 1.

Referring now to the drawing wherein like reference numerals are used throughout the various views to designate like parts, and more particularly to FIG. 1, the headrest of this Figure generally designated by reference numeral 1 consists of the center section 2, of the side sections 3 and of the two round support rods 4. The side sections 3 are constructed wedge shaped and are so attached at the center section 2 that they increasingly project from the center section toward the rear. The mutually parallel support rods 4 are secured at the padding core 5 arranged in the center section 2 in such a manner that the headrest 1 may be pivoted with respect to the support rods 4 about the axis 6. Within the area of the conically extending free ends of the support rods 4, the latter are provided with constrictions or grooves 7. Additionally, the support rods, as can also be seen from FIG. 2, are slightly bent through toward the rear.

For the support of the headrest 1, rectilinear guide members 9 are arranged recessed in the backrest 8 (FIG. 2) of a motor vehicle seat into which are inserted the slightly curved support rods 4 of the headrest 1.

Figure 3:
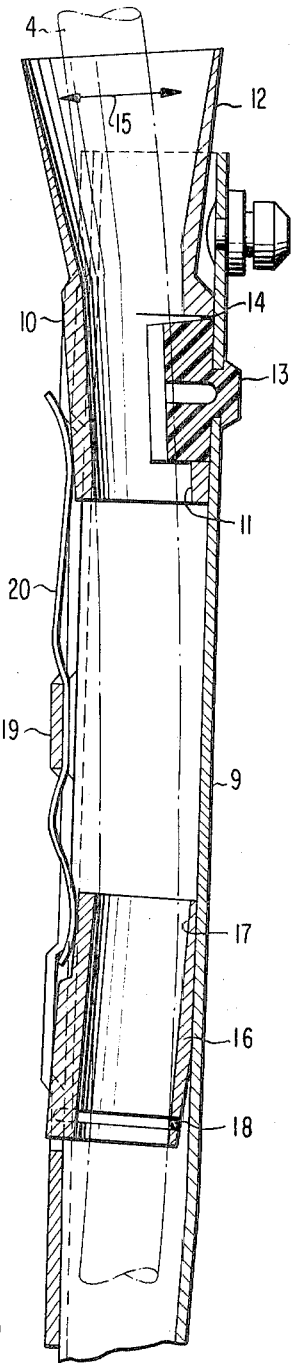
FIG. 3 is a partial longitudinal cross-sectional view through a guide member in accordance with the present invention.
Figure 4:
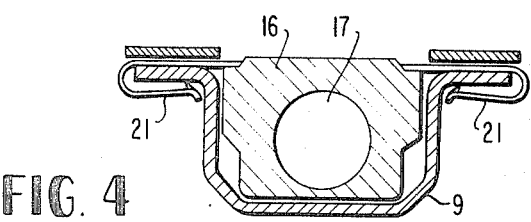
FIG. 4 is a cross-sectional view through the guide member of FIG. 3 at the height of the lower guide body.

As can be seen in conjunction with FIGS. 3 and 4, each of the guide members 9 consists of a rail with hat-shaped profile, in which the open side faces forwardly. The guide body 10 consisting of synthetic resinous material of any suitable type is arranged within the area of the upper end of the guide member 9. The guide body 10 is provided for the insertion of the support rod 4 with the bore 11 and with the insertion funnel 12. A brake body 13 is secured at the back side of the rail within the area of the guide body 10. The brake body 13 projects through the aperture 14 into the bore 11 of the guide member 10 and with an inserted support rod 4, abuts against the same with relatively large friction. The guide body 10 is movably supported within the guide member 9 in the direction of arrow 15 about a central cross axis.

The guide body 16 also consisting of synthetic resinous material is arranged in the guide member 9 at a spacing from and below the guide body 10 which is movable about a cross axis in the same manner as the guide body 10. The guide body 16 is provided with the bore 17 for pushing through the support rod 4. Furthermore, the wire ring 18 is arranged within the lower area of the guide body 16 which abuts with prestress against the support rod 4.

The leaf spring 20 disposed in the longitudinal direction of the guide member 9 is retained by means of the web 19 at the open side of the guide member 9. The leaf spring 20 abuts with its upper end in the lower area of the guide body 10 and presses the same into the position visible in FIG. 3 and abuts with its lower end against the upper area of the guide body 16 and also presses the same into the position illustrated in FIG. 3.

As can be further seen from FIG. 4, elastic or springy fixing clips or clamps 21 are arranged at the guide member 9 which press against the guide body 16 from the open side of the guide member 9, and more particularly approximately at the center of the guide body as to its height. In the same manner, also the guide body 10 is additionally fixed or held fast by such fixing clips or clamps.

In order to bring the headrest 1, for example, from the position according to FIG. 2, into the position illustrated in this Figure in dash and dot lines, it is only necessary to press or pull the headrest in the direction of arrow 22 and then to pull the headrest out of the guide members 9 while maintaining the pressure or pull. During this movement, both the braking action of the guide bodies 10 and 16 as also in particular the braking with larger friction by the brake body 13 is eliminated for the most part. After releasing the headrest, the friction of the guide bodies 10 and 16 and of the brake body 13 at the curved support rods 4 again becomes so large that the desired position of the headrest is maintained. The clamping action is increased by the pressure against the headrest 1 opposite the direction of arrow 22, i.e., during use of the headrest.

In the event that the headrest 1 is unintentionally pulled out too far out of the backrest, the wire rings 18 in the guide bodies 16 engage into the constrictions 7 at the support rods 4. By the use of a larger pressure, the headrest 1 can again be displaced in the direction toward the backrest. By the use of a larger pull, the headrest 1 can be completely removed from the backrest. The wire springs 18 reinforce the friction at the support rods 4. Possibly, instead of the guide body 10, the guide body 16 may be equipped with the brake body 13. In this case, the brake body, however would have to be arranged at the open side of the guide member.

While I have shown and described only one embodiment in accordance with the present invention, it is understood that the same is not limited thereto, but is susceptible of numerous changes and modifications as known to those skilled in the art, and I therefore do not wish to be limited to the details shown and described herein but intend to cover all such changes and modifications as are encompassed by the scope of the appended claims.

I claim:

1. The combination of a vertically adjustable headrest and attachment means to attach said headrest to the backrest of a motor vehicle seat, comprising at least one support rod means connected to the headrest, at least one substantially rectilinear guide means in the backrest for adjustably guiding the respective support rod means, each of said at least one support rod means being slightly curved, a plurality of spaced guide members arranged within each of said at least one guide means, each of said guide members being slightly movable substantially transversely to the longitudinal direction of the guide means, said guide members being arranged to engagingly surround the support rod means for holding the headrest in position.

2. The combination according to claim 1, characterized in that two mutually parallel support rod means and two rectilinear guide means are provided.

3. The combination according to claim 2, characterized in that a brake means projecting through an aperture in a respective guide member is arranged in each guide means.

4. The combination according to claim 3, characterized in that both an upper and a lower guide member are arranged in each rectilinear guide means and that the brake means are fixedly arranged in the respective upper guide members.

5. The combination according to claim 3, characterized in that the upper end of each guide means includes an upper guide member with an insertion funnel therein.

6. The combination according to claim 5, characterized in that each guide means includes a lower guide member, each lower guide member including a spring means for abutting with prestress at a respective support means, said spring means detachably engaging into a groove provided at the free end of the support rod means when pulling the latter out of the guide means.

7. The combination according to claim 6, characterized in that each guide means includes an upper guide member and a further spring means is arranged at each guide means between the two guide members for pressing the upper and lower guide members in the direction toward the curvature of the support rod means.

8. The combination according to claim 7, characterized in that said last-mentioned spring means presses the lower portion of the upper guide member and the upper portion of the lower guide member.

9. The combination according to claim 1, characterized in that a brake means projecting through an aperture in a respective guide member is arranged in each guide means.

10. The combination according to claim 1, characterized in that both an upper and a lower guide member are arranged in each rectilinear guide means.

11. The combination according to claim 1, characterized in that the support rod presents a concavely curved profile to the front side of the headrest and backrest combination.

12. The combination according to claim 1, characterized in that the guide means are disposed entirely within the outer contours of the backrests.

13. The combination according to claim 1, characterized in that said headrest is selectively detachably from said backrest.

14. The combination according to claim 1, characterized in that said headrest is manually adjustable to an infinite number of vertical positions.

15. The combination according to claim 10, characterized in that brake means are fixedly arranged in the upper guide member.

16. The combination according to claim 11, characterized in that the upper end of the respective guide means includes a guide member provided with an insertion funnel.

17. The combination according to claim 10, characterized in that a spring means abutting with prestress at a respective support rod means is arranged in each guide means at the lower guide member, said spring means detachably engaging into a groove provided at the free end of the support rod means when pulling the latter out of the guide means.

18. The combination according to claim 16, characterized in that a spring means is arranged at each guide means between the upper and lower guide members for pressing the upper and lower guide members in the direction toward the curvature of the support rod means.

19. The combination according to claim 18, characterized in that said last-mentioned spring means presses the lower portion of the upper guide member and the upper portion of the lower guide member.

20. The combination according to claim 8, characterized in that the brake means is fixedly arranged in the upper guide member.

* * * * *